United States Patent [19]

Schumann et al.

[11] 4,020,405

[45] Apr. 26, 1977

[54] PIPE-CUTTING AND/OR WELDING MACHINE WITH CLAMPING MOTOR TORQUE LIMITING CONTROL

[75] Inventors: Günter Schumann, Ober Roden, Messenhausen; Werner Becker, Liederbach, both of Germany

[73] Assignee: Messer Griesheim GmbH, Frankfurt am Main, Germany

[22] Filed: May 1, 1975

[21] Appl. No.: 573,753

[30] Foreign Application Priority Data

May 25, 1975 Germany .................... 2425349

[52] U.S. Cl. .................... 318/432; 30/96; 219/161; 269/216; 318/434
[51] Int. Cl.² .................... B23K 37/04; H02P 7/00
[58] Field of Search ............ 318/434, 432, 433, 6, 318/8, 9; 30/96, 97, 98; 219/159, 161; 269/216, 218, 285; 192/142 A, 142 R

[56] References Cited

UNITED STATES PATENTS

| | | | |
|---|---|---|---|
| 3,063,708 | 11/1962 | Wollenhaupt | 269/216 |
| 3,279,059 | 10/1966 | Keiter | 30/96 |
| 3,309,595 | 3/1967 | Safar | 318/434 X |

FOREIGN PATENTS OR APPLICATIONS 259,303   3/1968   U.S.S.R. .................... 219/161

*Primary Examiner*—Robert J. Hickey
*Attorney, Agent, or Firm*—Connolly and Hutz

[57] ABSTRACT

A pipe cutting and/or welding device has a chuck for rotating the pipe with the chuck jaws connected with an activating device provided with torque limiting means. The torque limiting means has an adjusting device for switching from a low torque value for the clamping of the pipe to a high torque value for releasing the pipe.

4 Claims, 3 Drawing Figures

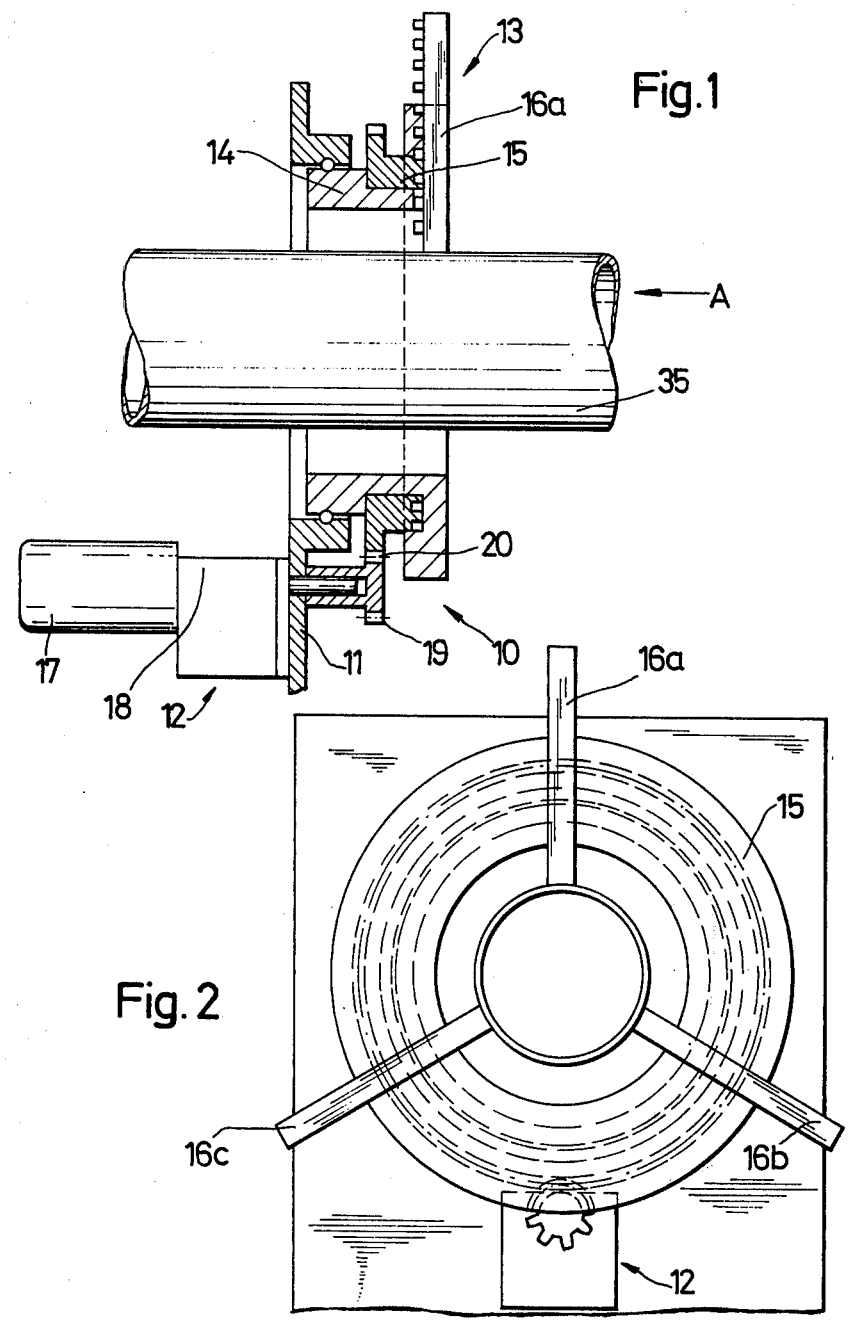

PIPE-CUTTING AND/OR WELDING MACHINE WITH CLAMPING MOTOR TORQUE LIMITING CONTROL

BACKGROUND OF THE INVENTION

The present invention relates to a pipe-cutting and/or welding machine with a pipe-turning arrangement, which has a chuck whose jaws are in contact with an activating device for the movement of the jaws.

Pipe-cutting machines serve for the preparation of pipe fitting sections; for the preparation of various types of cuts, a respective movement of the cutting torch as well as of the pipe to be cut being required. The movement of the cutting torch is usually undertaken by means of compound lever arrangements as taught for example by German Patent No. 937,387; 940,027 and 961,588.

For moving and stopping the pipe to be cut, the pipe in most instances is clamped in a pipe-turning arrangement by means of a chuck. For the moving of the chuck which clamps or releases the pipe, an activating device is provided having an electric motor with a clutch. The clutch is constructed here in such a manner that a predetermined factor it slips and consequently the clamping momentum, hence the force with which the chuck jaws are pressed against the pipe, is limited to a predetermined value. It has been shown in practice that by means of such an arrangement only a single constant tension value may be achieved, wherein the extent of the tension value must be designed in such a manner that both thick-walled as well as thin-walled pipes may be clamped firmly. The activating device was therefore designed for an average tension, which is sufficient for clamping thick and thin-walled pipes. In this connection, however, it has been shown that under certain circumstances the preselected tension with respect to thick-walled pipes, may lead to an insufficient grip, whereby relative movements between pipe and chuck may set in. On the other hand, with thin-walled pipes, the preselected tension may lead to a deforming of the pipe, something which is equally undesirable.

A further drawback of these known arrangements is that in many instances, upon the release, the forces transmitted from the activating device to the chuck jaws do not suffice to release the pipe. In most cases, the operator must proceed manually and remove the jaws from the pipe by externally exerted force on the chuck or chuck jaws. Even the introduction of a so-called impact clutch — wherein a clutch half slips, by a defined measure, upon reaching a certain rotational speed and hits against a stop provided on the other clutch half — indeed brings about an improvement with respect to the releasing of the chuck jaws but effects, on the other hand, very great mechanical strain on the entire clamping device, whereby its exactness and service life is considerably reduced.

SUMMARY OF THE INVENTION

Applicants have recognized that the chucks normally employed in machine tools, particularly turning machines, and their structural problems as well as their design with respect to tension, etc., may not be transferred to those pertaining to the clamping of pipes, which are cut or welded by torch, as this has been shown in practice. Furthermore, applicants have recognized that the difficulties in the releasing of the chuck jaws from the pipe are traced back to the fact that during the processing procedure (torch cutting or welding) relatively much heat is brought into the clamped pipe, whereby it expands to a small extent. The chuck jaws become locked in their guide plate (adjusting nut) and pressed thereby with a greater force against the pipe, as this is the case due to the preset clamping force.

Furthermore, it has been established that the chuck jaws in the adjusting nut are additionally locked when long, multiply stacked pipes are clamped at one end in the clamping device. This locking is traced back to the fact that, with respect to a multipoint stacking, it is not made certain that all clamping and supporting units grip the pipe in such a manner that it lies exactly in a plane (alignment). Furthermore, particularly if it is considered that this relates to long pipes (up to 10 meters) with a diameter of between about 50 mm and 1200 mm, in practice, such an alignment accuracy can never be achieved exactly, so that the pipe will always be slightly bent and consequently additional forces affect the chuck jaws.

Emanating from this knowledge, it is the object of the present invention to provide a pipe cutting or welding machine of the initially stated type, which has a clamping device for the work piece to be processed, which also assures a satisfactory clamping of various pipe thicknesses as well as a satisfactory releasing of the jaws of the clamping device abutting the pipe.

The invention consists of a torque limiting means being provided for the activating device for shifting the chuck jaws and furthermore that the torque limiting means has a setting means for switching from a low torque factor for clamping the pipe to a higher torque factor for releasing the chuck jaws from the pipe.

Due to the invention, it is now possible to press the chuck jaws with a preselected, defined clamping force, which is selected according to the pipe requirements, against the pipe to be clamped. Furthermore, due to the switching device, it becomes possible to effect a considerably greater force for releasing the clamping jaws from the pipe. Thus, a clamping device is provided for a pipe-cutting machine which does not exhibit the above-mentioned drawbacks and by means of which the problem presented is solved.

In an advantageous further development of the invention, it is proposed that the activating device have an electric motor, preferably a DC gear motor and that an armature current limiting regulator is provided in the control circuit of the motor as the torque limiting means. In a simple manner, a torque limitation is achieved thereby and a device provided, furthermore, wherein a switching over from a lower torque for the clamping to a higher torque for releasing may be achieved by small means.

In such a device, a motor speed regulator is preferably provided in the control circuit of the motor. Thereby the advantage is achieved that independent on the clamping forces transmitted to the chuck jaws (on the basis of the differing torques of the motor), the rotational speed and consequently the movement speed of the chuck jaws is maintained constant.

However, it is also possible of course to design the motor speed regulator in such a manner that the motor speed shows values different from each other in the clamping and/or in releasing, so that depending on the requirements, for example, the chuck jaws are movable toward the pipe for clamping with an increased speed, as this is the case in the releasing of the chuck jaws.

In addition, it is suggested according to the invention that the torque limiting means be constructed as a slip clutch, known per se, and that the clutch have a spring, with adjustable spring tension, determining the frictional force between the clutch halves. In this connection, the spring is prestressed in such a manner that for clamping the chuck jaws to the pipe, a low spring tension is effective and consequently the force for releasing the chuck jaws from the pipe is also greater. The switching of the spring prestressing may take place by means of mechanical, electromechanical or similar means.

THE DRAWINGS

FIG. 1 is a schematic illustration of a motor-activated clamping device in accordance with this invention;

FIG. 2 is a view looking in the direction of arrow A of FIG. 1; and

DETAILED DESCRIPTION

Figure 3:
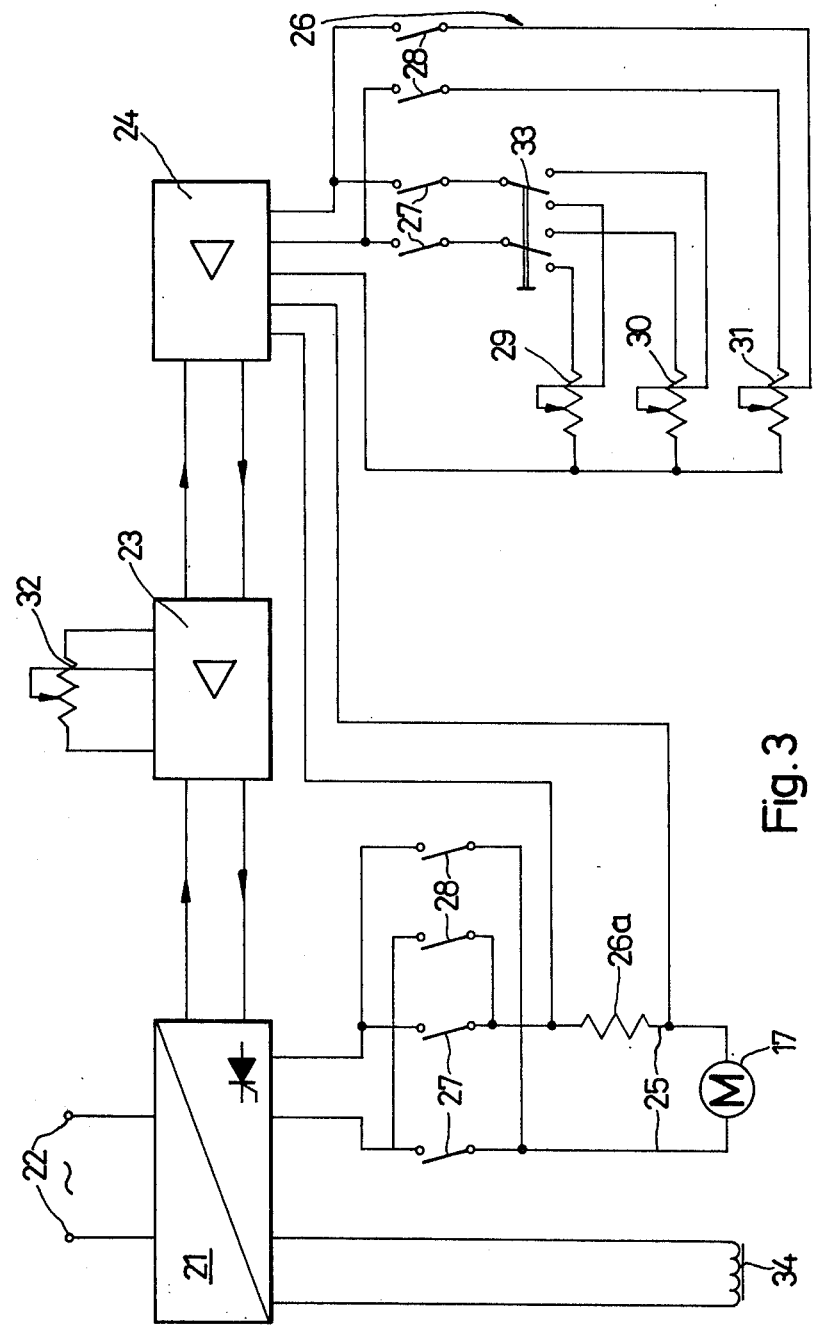
FIG. 3 is an electrical block diagram of the novel activating device of this invention.

In FIG. 1 is illustrated the pipe-turning device 10 of a pipe-cutting and/or welding machine, known per se. The turning device 10 has a feed plate 11 with an activating device 12 mounted thereon. In feed plate 11, a chuck 13 is turnably supported. Chuck 13 consists essentially of a base member 14, a chuck nut 15 turnable on this base member, as well as chuck jaws 16a, 16b and 16c movable by means of chuck nut 15. In this connection, the pitch of the threading of the chuck nut 15 into which the teeth of the chuck jaws 16a–16c engage is chosen in such a manner that a self-locking thread effect sets in. The construction of such a chuck is known per se, so that the individual structural characteristics need not be discussed in detail.

The activating device 12 encompasses an electric motor, preferably a DC gear motor 17, which communicates with a pinion 19 by means of a gear coupling 18 illustrated schematically. Pinion 19 engages in a gear 20 of chuck nut 15. Upon turning of motor 17, the chuck nut 15 is turned by means of pinion and the chuck jaws — depending on rotational direction — are moved toward pipe 35 or away from said pipe.

By way of the electrical block diagram of FIG. 3, the novel activating device as well as its manner of functioning are explained. Motor 17 is in contact with a supply source 22 by means of a phase-gate-controlled bridge 21. Bridge 21, which preferably is a semi- or fully controlled thyristor bridge, is controlled by impulses from speed regulator 23.

Speed regulator 23 is connected at the input with armature current regulator 24 constructed as a threshold value switch. The current flowing in armature circuit 25 is picked up by means of resistor 26a and supplied as an actual value to armature current regulator 24 and compared therein with a preselected theoretical value determined by the size of resistors 29–31. The resulting difference is counterswitched to the value preset by resistor 32 and the signals formed thereby in speed regulator 23 conducted to bridge 21.

Futhermore, in the armature circuit 25 as well as in the control circuit 26 of armature current regulator 24, there are provided interchangeable switches 27, 28 coordinated with each other.

Resistors 29, 30, and 31 in control circuit 26 serve in the individual operating conditions for the setting of the armature current limitation. In a particular embodiment these resistors have the following functions. Resistor 29 serves for the setting for the clamping of thin-walled (wall thickness less than 10 mm) pipes; ca. 40 percent of the maximum armature current. Resistor 30 serves for the setting for the clamping of thick-walled (wall thickness greater than 10 mm) pipes; ca. 60 percent of the maximum armature current. Resistor 31 serves for the setting for the release of the clamping jaws from the pipe; 100 percent of the maximum armature current. Resistor 32 in the speed regulator 23 serves for the setting of the movement speed of the clamping jaws.

For the clamping of jaws 16a–16c, contacts 27 are closed, whereby, depending on the position of switch 33, either resistor 29 or resistor 30 limits the armature current for the clamping of the pipes.

For the release, contacts 27 are opened and contacts 28 closed, whereby resistor 31 is determinative as the actual value for the armature current. In this instance, the armature current is then set to 100% of the maximum allowable value.

By means of the device illustrated in the figures, it is achieved in a simple manner that by electrical means, the adjustment of the torque for releasing or clamping the chuck jaws may be undertaken by the simplest ways and means.

Aside from this exemplary embodiment, wherein the structural development of the individual electronic and electrical parts need not be further detailed, since their construction is generally known to one skilled in the art, still further embodiments are possible of course.

For example, in place of the DC electric motor, a respectively regulated AC motor or a hydraulic motor, e.g. a hydraulic stepping motor, may be employed. In that case, the torque limiting may be undertaken advantageously by means of respectively constructed hydraulic adjusting devices.

Furthermore, it is possible to effect a torque change by influencing respectively the field of a DC motor in place of the proposed armature current limitation. This field coil is schematically designated as 34 in FIG. 3.

In the above exemplary embodiment, the pipe is radially clamped at the outside periphery by means of the clamping device, whereby the pipe, after the clamping, is to be turned by means of chuck 13. In order to enable a satisfactory turning, it is preferred that after the clamping of the chuck jaws, the motor 17 is mechanically separated from the pinion by means of clutch 18. It is also possible, of course, to utilize the invention for pipe-clamping devices which are structurally different from the exemplary embodiment, e.g. for clamping devices whose jaws grasp inside the pipe.

What is claimed is:

1. In a machine for pipe-cutting or welding and the like including a pipe-turning device having a chuck with pipe engaging jaws operated by an actuating device for moving the jaws into and out of engagement with the pipe, the improvement being said activating device having torque limiting means, said torque limiting means including adjusting means for selectively switching to a low torque value for causing said jaws to clamp the pipe and to a high torque value for causing said jaws to be released from the pipe.

2. In the machine of claim 1 wherein said activating device includes a DC gear electric motor having a control circuit, and said torque limiting means comprising an armature current limiting regulator in said control circuit.

3. In the machine of claim 2 including a motor speed regulator in said control circuit.

4. In the machine of claim 3 wherein said control circuit includes an electrical supply source, a phase-gate-controlled bridge contacting said supply source with said motor, said speed regulator and said armature current regulator emitting signals for controlling said bridge, an armature circuit having current flowing as an actual value to said armature current regulator, said armature current regulator having a control circuit, and said armature circuit and said current regulator control circuit having selectively interchangeable switches coordinated with each other for determining the clamping and releasing action of said jaws.

* * * * *